Aug. 24, 1948.  T. F. CASS, JR., ET AL  2,447,997
APPARATUS FOR SEALING CONTAINERS
Filed April 23, 1943  8 Sheets-Sheet 1
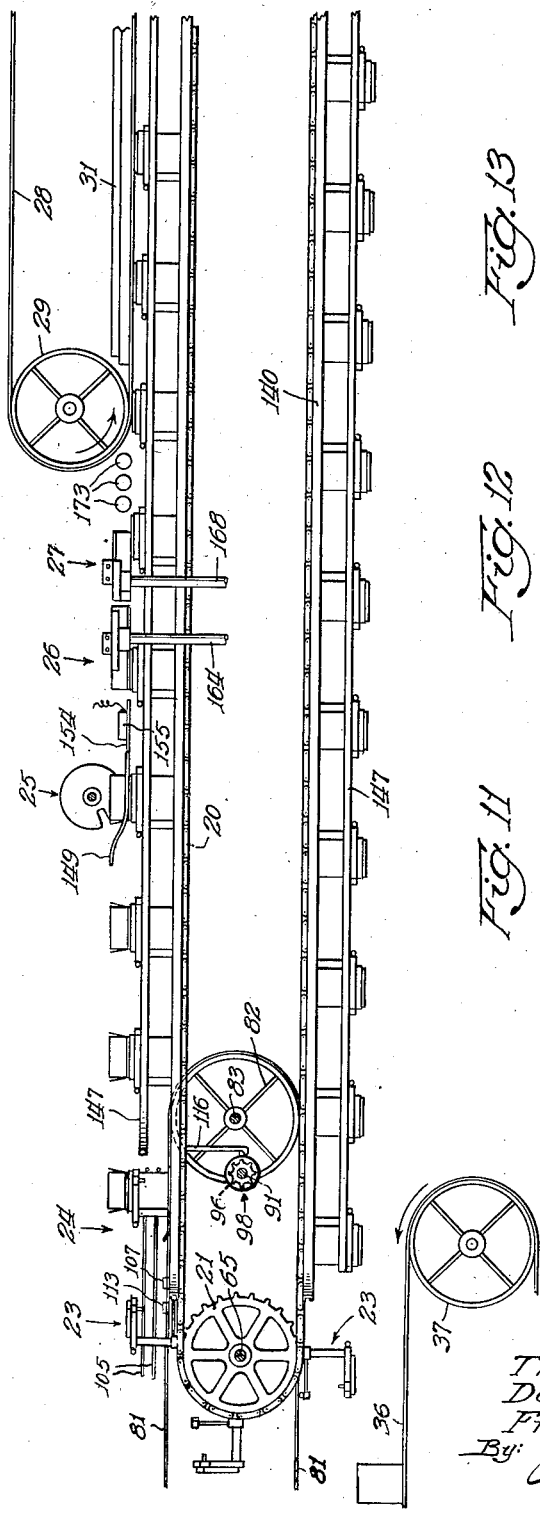
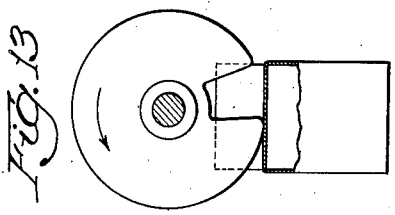
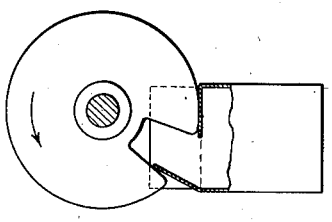
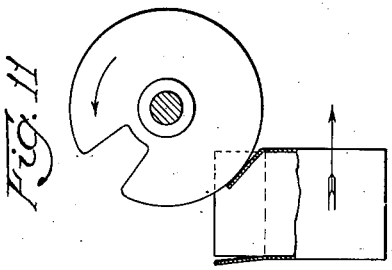
INVENTORS:
Thomas F. Cass, Jr.
Douglas Kirk and
Francis W. Lanigan
By: C. H. Seeley
Atty.

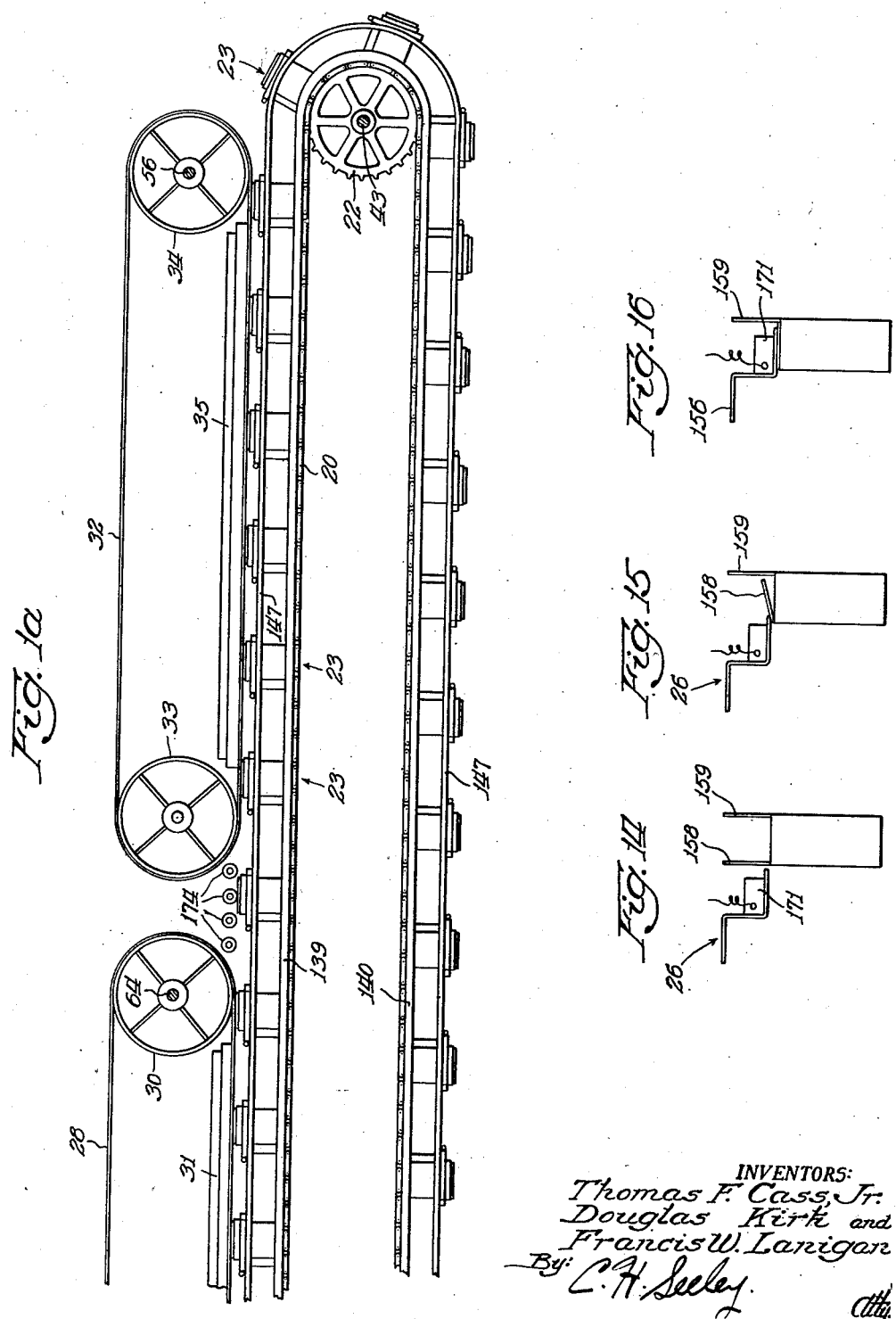

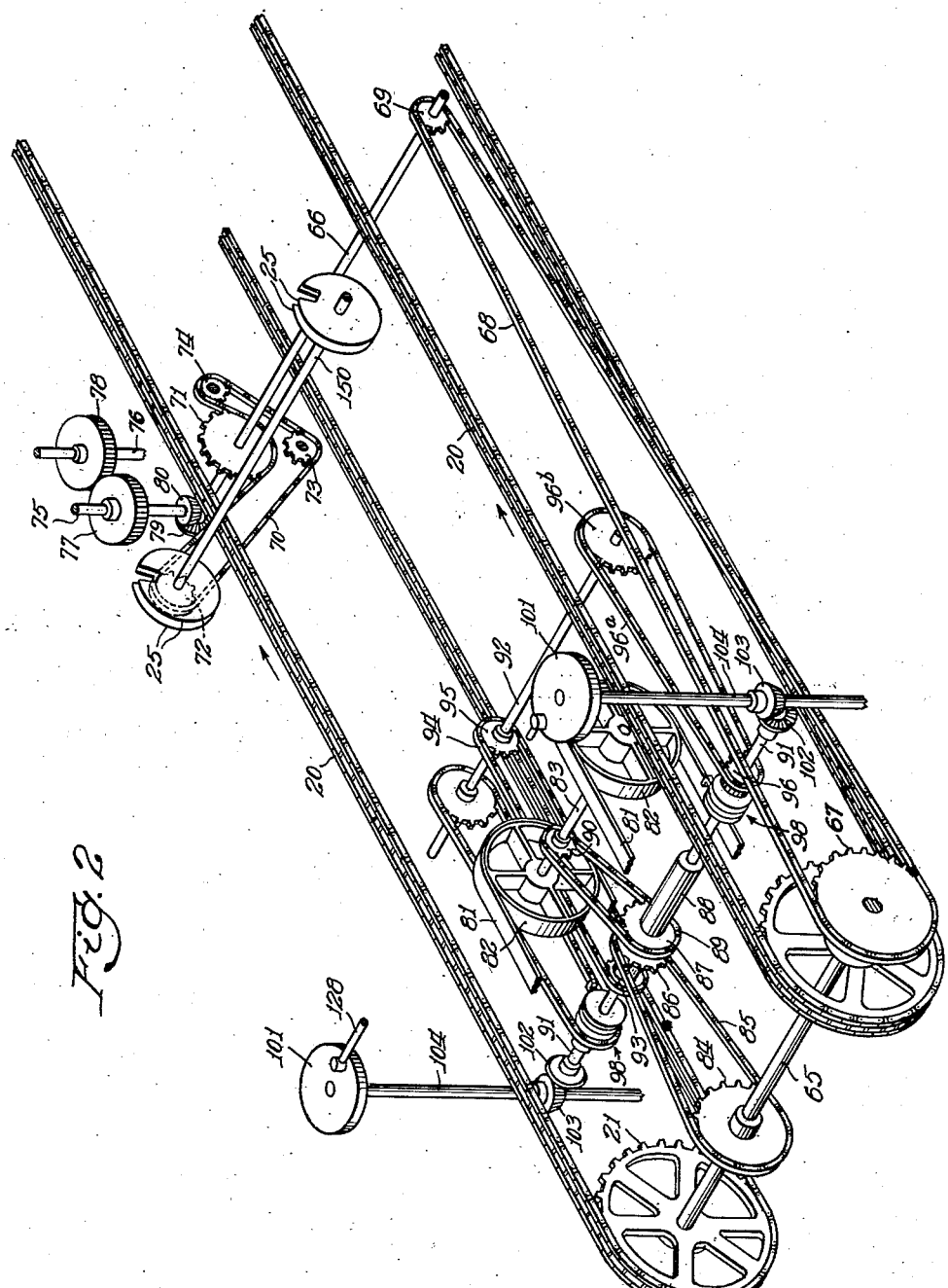

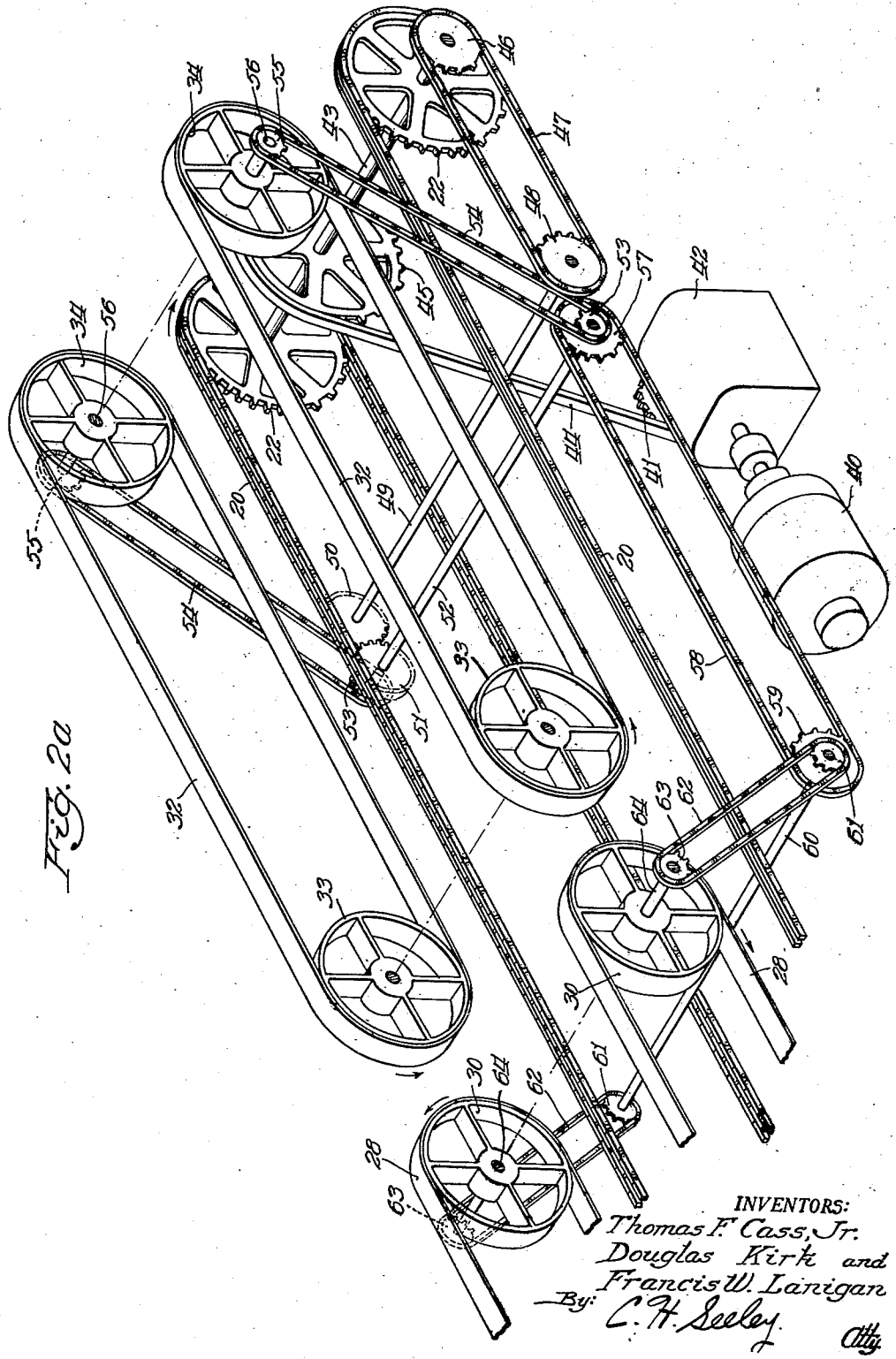

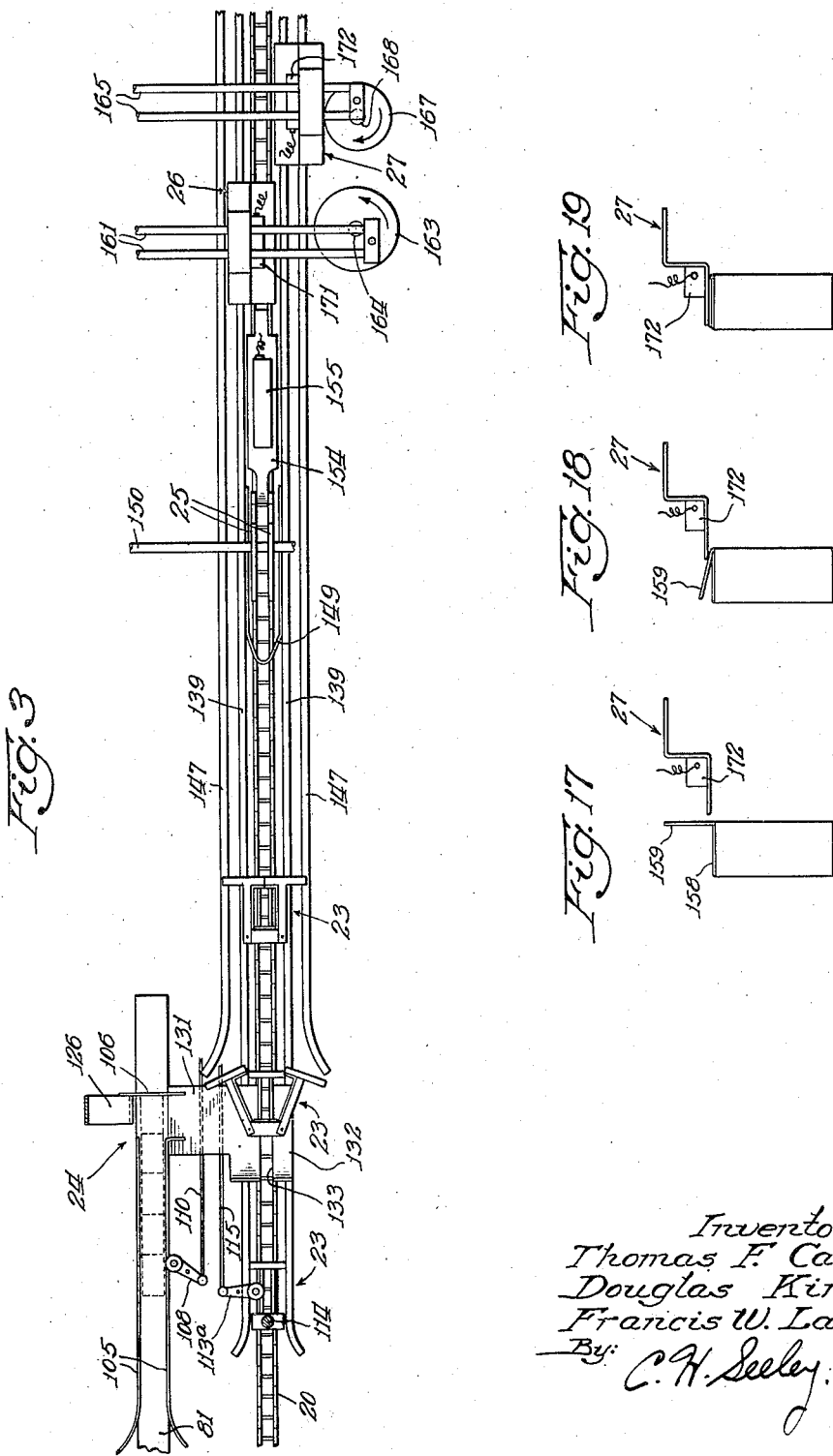

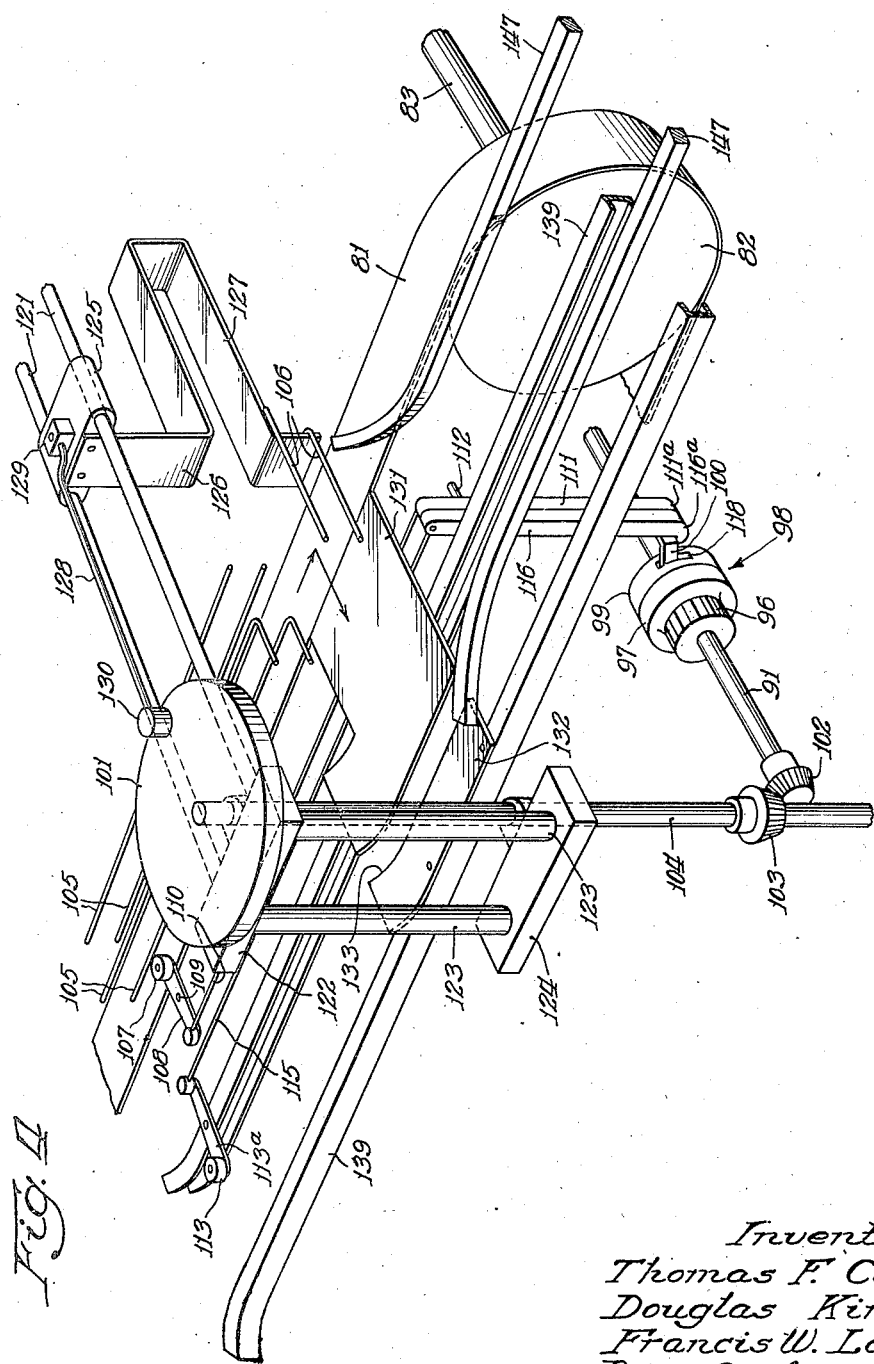

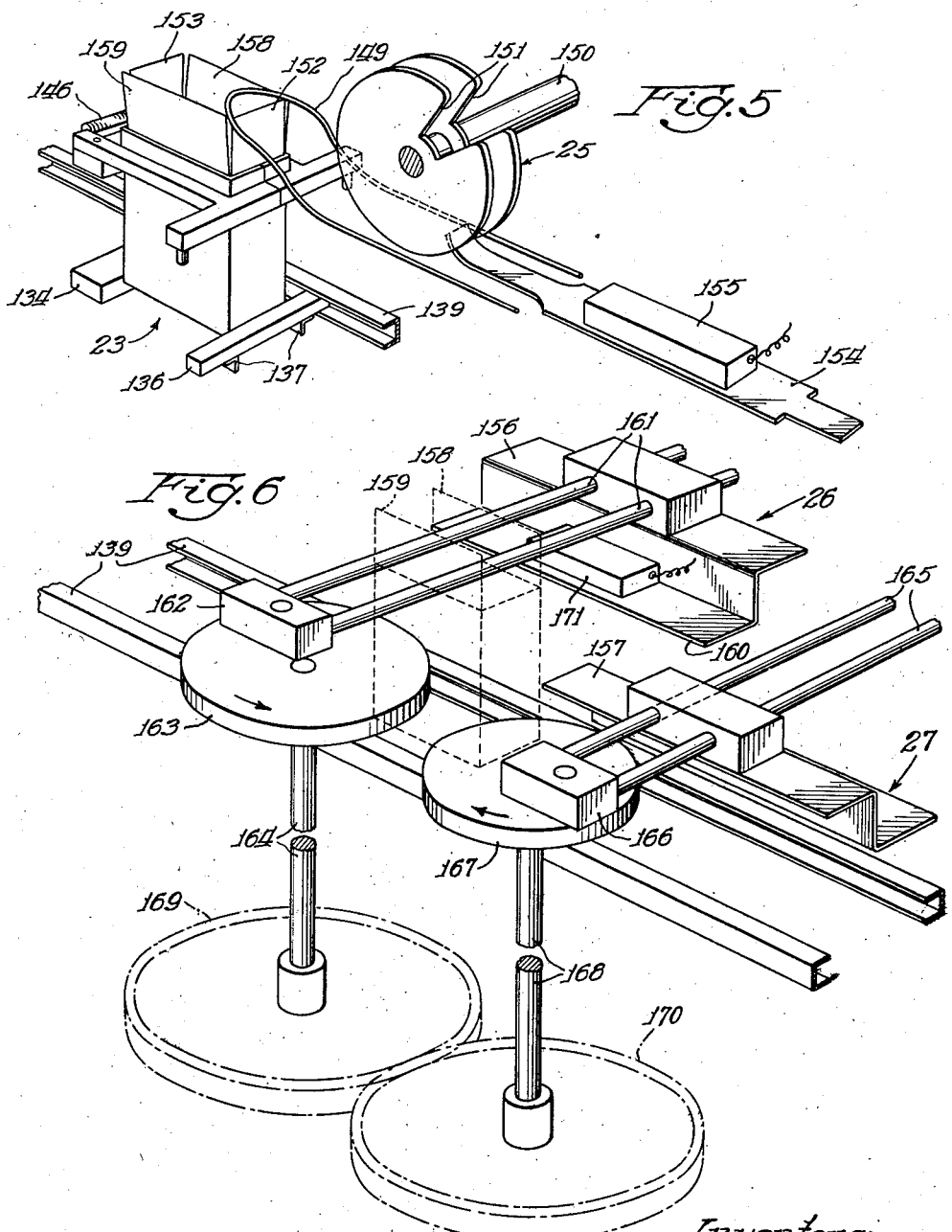

Aug. 24, 1948.  T. F. CASS, JR., ET AL  2,447,997
APPARATUS FOR SEALING CONTAINERS
Filed April 23, 1943                                     8 Sheets-Sheet 8

Inventors:
Thomas F. Cass, Jr.
Douglas Kirk and
Francis W. Lanigan
By: C. H. Seeley
Atty.

Patented Aug. 24, 1948

2,447,997

UNITED STATES PATENT OFFICE 2,447,997

APPARATUS FOR SEALING CONTAINERS

Thomas F. Cass, Jr., Wayne, and Douglas Kirk, Chicago, Ill., and Francis W. Lanigan, Lincoln, Mass., assignors, by direct and mesne assignments, to Container Corporation of America, Chicago, Ill., a corporation of Delaware Application April 23, 1943, Serial No. 484,306

7 Claims. (Cl. 93—6)

This invention relates to apparatus for sealing containers and more particularly to continuous automatic machines especially adapted to receive paper board cartons which have been filled with a desired product and to effect closing and sealing of the top flaps thereof.

While a number of types of machines for this purpose, generally referred to as "top-sealing machines," are available and many others have been proposed, they are generally not adapted to be used in connection with a packaging process involving heat-sealing of the top carton flaps, or they are characterized by relatively slow intermittent motion with attendant wear of the working parts. The machine of the present invention is so arranged that it is simple in construction, and fast and smooth in operation, and it is peculiarly adapted for heat-sealing the top flaps of filled cartons, although some of the novel features thereof are equally adapted to be used on sealing machines employing an ordinary adhesive to seal the cartons.

It is an object of the invention to provide a simple type of continuous top-sealing machine which is especially adapted to close and heat-seal the top flaps of cartons which have been coated with a thermoplastic material. Another object is to provide a top-sealing machine in which heat-sealing of the top closure is effected primarily by means of traveling belt means substantially synchronized with the motion of the cartons and through which heat is first transmitted to the top closure and then removed therefrom. A further object is to provide a novel and efficient collar arrangement for holding the cartons during the top-sealing operation. Still another object is to provide an extremely simple arrangement for removing sealed cartons from the carton pockets. Further objects, advantages and uses of the invention will be apparent from the following detailed description of a presently preferred embodiment thereof, which should be read in conjunction with the drawings forming a part of this specification.

In the drawings:

Fig. 1 is a simplified view in elevation of one end of a sealing machine according to the invention showing the relationship of the carton supply and removal arrangements and various other features;

Fig. 1—A is another simplified elevational view showing the other end of the machine of Fig. 1 and constituting a continuation of Fig. 1;

Fig. 2 shows in perspective the driving mechanisms which actuate the various devices incorporated in that end of the machine illustrated in Fig. 1;

Fig. 2—A is a continuation of Fig. 2 showing the driving mechanisms associated with the end of the machine illustrated in Fig. 1—A;

Fig. 3 is a partial plan view of one of the duplicate carton-sealing lines with which the machine of Figs. 1 and 1—A is equipped, illustrating particularly the carton entrance arrangement, the operation of the carton pockets and the flap-folding devices;

Fig. 4 is an enlarged perspective view of the carton entrance mechanism in somewhat greater detail;

Fig. 5 is an enlarged perspective view of the first carton flap-folding mechanism;

Fig. 6 is an enlarged perspective view of the second of the flap-folding mechanisms;

Figs. 11, 12 and 13 represent diagrammatically three successive stages in the folding of the end wall flap;

Figs. 14, 15 and 16 represent diagrammatically three successive stages in the folding of one of the side wall flaps; and Figs. 17, 18 and 19 represent diagrammatically three successive stages in the folding of the overlying side wall flap.

Figure 7:
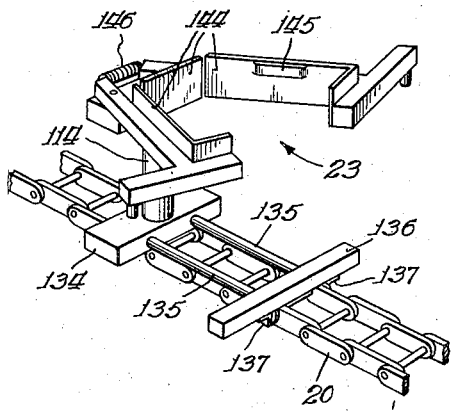
Fig. 7 shows in perspective one of the carton pockets with its jaw members open for the reception of a carton.

The particular embodiment of the invention illustrated in the drawings is a top-sealing machine provided with two separate carton-sealing lines which are identical in construction and operation, but for the sake of brevity and simplicity, only one of these lines will be completely described. Furthermore, it will be observed that the drawings show little or no supporting structure such as frames, bearings, bearing supports, etc., since such structure is not essential to an understanding of the invention and could be supplied readily by one skilled in the art.

Referring first to Figs. 1 and 1—A, an endless chain 20 is arranged to travel over sprockets 21 and 22, so that its upper reach moves from left to right, and it is provided at regularly spaced intervals with a series of carton pockets generally designated at 23. While each of these arrangements will be described in detail below, Figs. 1 and 1—A indicate the relative positions of the carton inlet mechanism 24, the end wall flap-folding discs 25, the side wall folding devices 26 and 27, the endless belt 28 traveling over pulleys 29 and 30 and through which heat is transmitted to the carton tops from heating element 31, the endless belt 32 which travels on pulleys 33 and 34 and which is cooled by the cooling element 35, and the carton removal arrangement which comprises belt 36 traveling on pulley 37 and another pulley which is not shown.

It is believed that the operation of these parts can be explained more simply if the driving mechanism which actuates them and which have been largely omitted from Figs. 1 and 1—A, are first described, and reference is, therefore, made to Figs. 2 and 2—A. Due to the fact that all of the movements of the various parts except belt 36 must be synchronized, they are all driven from a single prime mover, which is illustrated by way of example in Fig. 2—A as electric motor 40 and which drives sprocket 41 through the speed-reducing unit 42. Sprocket 41 in turn drives shaft 43 by means of chain 44 and sprocket 45, thus causing uniform continuous motion of the chains 20 which travel on sprockets 22 mounted on shaft 43. At one end of shaft 43, sprocket 46 is provided which drives the two cold belts 32 substantially in synchronism with chains 20 by means of a linkage consisting of chain 47, sprocket 48, shaft 49, gear 50, gear 51, shaft 52, sprockets 53, chains 54, sprockets 55 and shafts 56. The lower reach of each of the belts 32 is located directly above one of the chains 20 and the gear and sprocket ratios are such that belts 32 travel at the same or nearly the same linear velocity as chains 20. Hot belts 28 are similarly actuated from shaft 52 by means of sprocket 57, chain 58, sprocket 59, shaft 60, sprockets 61, chains 62, sprockets 63, shafts 64 and pulleys 30, and they are also substantially synchronized with chains 20.

The remainder of the mechanism is actuated from shaft 65 (Fig. 2) upon which sprockets 21 are mounted and which is driven by the movement of chains 20 over sprockets 21. The flap-folding mechanisms 25, 26 and 27 are all driven from shaft 66 which rotates at a speed bearing a definite ratio to that of shaft 65 since it is coupled thereto by means of sprocket 67, chain 68 and sprocket 69. The rotation of end wall flap-folding discs 25 is accomplished by means of chain 70 running over sprockets 71, 72, 73 and 74 and the relative sizes of the various sprockets involved are chosen in this case so that discs 25 make two complete revolutions during the time required for chain 20 to travel a distance equal to the spacing between equivalent parts of adjacent carton pockets 23. The reason for this will be discussed more fully when the folding operation is described. The side wall flap folders 26 and 27 are actuated by two vertical shafts 75 and 76 upon which are mounted the cooperating gears 77 and 78, so that they turn at an equal rate but in opposite directions, shaft 75 being in turn driven from shaft 66 by means of the cooperating bevel gears 79 and 80. It will be understood that another pair of side wall flap folders are similarly arranged and driven from the other end of shaft 66.

The carton supply belts 81 which deliver the cartons to the duplicate mechanisms for transferring cartons to the carton pockets 23 mounted on each of the chains 20 are synchronized with the chains 20 and travel over pulleys 82 mounted on shaft 83 and another pair of pulleys which are not shown. This drive runs from sprocket 84 on shaft 65 through chain 85, sprockets 86 and 87 mounted on sleeve 88, and chain 89, to sprocket 90 on shaft 83. Sleeve 88 is arranged to rotate on but independently of the shafts 91 and, since the latter are used to actuate the mechanisms for pushing cartons into position to be picked up by the carton pockets 23 and it is not desirable to have these mechanisms always operate simultaneously on both top-sealing lines, the two shafts 91 are also capable of rotating independently of one another.

For the purposes of simplicity, the operation of the carton-supplying mechanism will be described as to the particular carton-sealing line appearing closer to the observer in the various drawings and it will be understood that like parts are provided to operate similarly in connection with the other such line. Referring, therefore, to Fig. 2, it will be seen that shaft 92 is driven from sleeve 88 by means of sprocket 93, chain 94 and sprocket 95, and that shaft 92 in turn drives sprocket 96 by means of chain 96a and sprocket 96b. Sprocket 96 is arranged to rotate freely on shaft 91 and to actuate the adjacent portion 97 of the clutch 98 as is best illustrated in Fig. 4. The other portion 99 of the clutch 98 is keyed to shaft 91 and the clutch mechanism is so arranged that portion 99 will be actuated by the driven portion 97 only when trip arm 100 is released. In this way, shaft 91 and disc 101 driven therefrom by means of bevel gears 102 and 103 and shaft 104 rotate through one complete revolution every time trip arm 100 is released.

Since the object of the carton entrance mechanism is to cause the cartons supplied to the machine to be transferred individually without fail and without the possibility of jamming from belt 81 into the various carton pockets 23 as they pass by on continuous moving chain 20, it is necessary that two conditions exist at the same time in order that the mechanism actuated by disc 101 be put into operation. The first of these is that a carton should be ready to be pushed to a position just above chain 20 so that it can be picked up by an approaching sprocket 23. This condition is assured by causing trip arm 100 to be held unless there are a plurality and in this instance, at least, five cartons awaiting further handling. This is best seen in Figs. 3 and 4, the former of which shows the cartons on belt 81 and between guides 105 being held against further movement by rod 106 forming a part of the pushing mechanism. The last of these cartons bears against the roller 107 mounted on lever 108 pivoted at 109 so that rod 110 is moved to the left, From Figs. 4, 9 and 10, it will be seen that this causes the lower end of lever 111, which is pivoted at 112, to move away from and release trip arm 100, since its lower end is provided with a hook portion 111a which would normally engage trip arm 100. It is apparent, therefore, that as long as the supply of cartons is sufficient, lever 108, rod 110 and lever 111 will be in the position shown in Fig. 10, and will not prevent the engagement of the clutch 98. When not enough cartons are available, this arrangement will prevent clutch 98 from becoming engaged and actuating the pushing device.

The second condition, namely, that the approaching carton pocket 23 is in the proper spaced relation to the point of carton entrance, is achieved by similar means. Referring again to Figs. 3 and 4, it will be seen that roller 113 mounted on lever 113a will engage the upright post 114 forming a part of carton pocket 23 as it passes and that this will cause rod 115 to be moved to the left. Thereupon, the lower end of lever 116, which also has a projecting portion 116a will be swung away from trip arm 100 to the position shown in Fig. 10, thus releasing trip arm 100 and allowing the clutch 98 to become engaged and causing shaft 91 and disc 101 to make a complete revolution as previously described.

Figure 9:
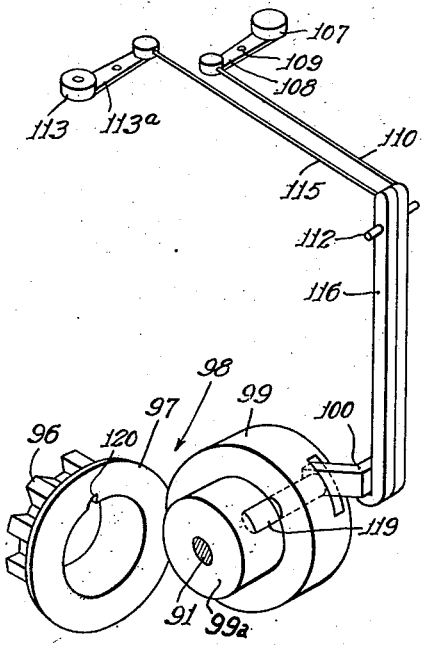
Fig. 9 is a fragmentary view showing the trip mechanism for synchronizing the entering cartons with the continuously moving carton pockets.
Figure 10:
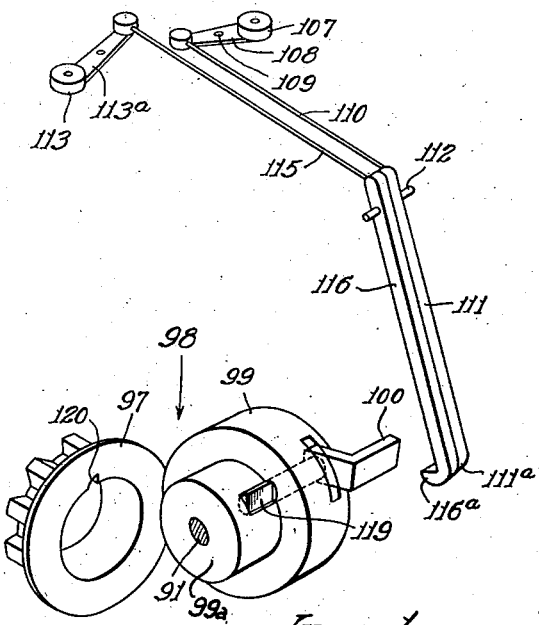
Fig. 10 is another view of the trip mechanism of Fig. 9 illustrating the position of the parts when the clutch member is engaged.

Clutch 98 is of a conventional type but it will be described briefly in connection with Figs. 9 and 10. The ring portion 97, which is here shown swung away to reveal other portions of the device, is adapted to rotate on the laterally extending collar portion 99a which is integral with portion 99, and it is, as previously mentioned, connected to and driven by sprocket 96. Portion 99 is arranged to drive shaft 91 by means not shown and it is provided with a special key 117 which is circular in cross-section so that it may be rotated about its own axis in a cooperating keyway within member 99. Key 117 is rigidly affixed to trip arm 100 which emerges from member 99 through slot 118, so that key 117 will be rotated through a small angle as trip arm 100 moves between the positions shown in Fig. 9 and Fig. 10. Also trip arm 100 is normally urged in the position shown in Fig. 10 by means of a suitable spring not shown. The other end of key 117 consists of a flattened portion 119 extending beyond member 99 and capable of being located entirely within suitable slot on collar portion 99a, and the parts are arranged so that this situation exists when the trip arm is held in its upward position as shown in Fig. 9.

It will be apparent that as long as trip arm 100 is held by either lever 111 or lever 116, there will be no engagement between the key portion 119 and the ring portion 97 and the shaft 91 will remain stationary. However, when both levers 111 and 116 are swung away from trip arm 100, and the latter assumes the position shown in Fig. 10 due to the urging of the spring previously mentioned, flattened portion 119 will partially emerge from its slot whenever it is in register with the groove 120 in the inner surface of the member 97. It is thus apparent that even though trip arm 100 is released, the clutch will not be engaged until a very definite point in the cycle is reached, and that the shaft 91 will then be rotated until trip arm 100 is engaged by at least one of the levers 111 and 116. Due to the fact that it is desirable to have the carton-pushing action relatively fast, the sprocket ratios chosen are such that one complete revolution is made in considerably shorter time than is required for chain 20 to move a distance equivalent to the distance between adjacent carton pockets 23. Consequently, trip arm 100 will be engaged by lever 116 after each revolution, whereas it will not normally be engaged by lever 111 unless the carton supply is insufficient. Furthermore, it will be observed that all of the rotating mechanism is synchronized with the motion of the chain 20, and the location of groove 120 is such that the complete carton-pushing action can take place between the time the carton pocket post 114 engages roller 112 and the time that particular carton pocket 23 reaches the carton to be picked up by it.

The details of the mechanism for transferring the cartons successively and at the proper times with respect to the position of carton pockets 23 are best shown in Fig. 4. A pair of horizontal rods 121 extend on either side of shaft 104 just below disc 101 and are supported at one end by bar 122, which in turn is supported by posts 123 mounted on a base member 124 secured to the machine frame not shown. The other ends of rods 121 are similarly supported on the other side of the machine and are similarly related to the shaft 104 and disc 101 associated with the carton-sealing line on that side of the machine as has already been stated. The working parts for both carton-sealing lines are identical so that only one will be here described. A block 125 is slidably mounted on rods 121 and carries depending therefrom a carton-pushing member 126, the latter having an off-set portion 127 so that when the block 125 moves toward chain 20 and member 126 pushes a carton in the direction, the next carton on belt 81 will be retained in its position until member 126 has been returned to its original position, whereupon belt 81 carries this carton forward until it is retained by rods 106 which is also carried by member 126. This sliding motion is achieved by means of a curved rod 128 which is secured at one end to pivot 129 on the upper surface of block 125 and at the other to a pivot or bearing 130 on the upper surface of disc 101 near the circumference thereof. It will be appreciated therefore that whenever the clutch 98 is engaged in the manner already described, disc 101 will make a complete revolution and member 126 will travel toward and away from the path of chain 20 so as to transfer a carton from belt 81 to a point directly above the axis of chain 20. During this step, the carton slides upon plate 131 and rests partly on plate 131 and partly upon strip 132 which is separated therefrom by an opening 133 sufficiently wide to allow the post 114 of each carton pocket 23 to pass therethrough.

Figure 8:
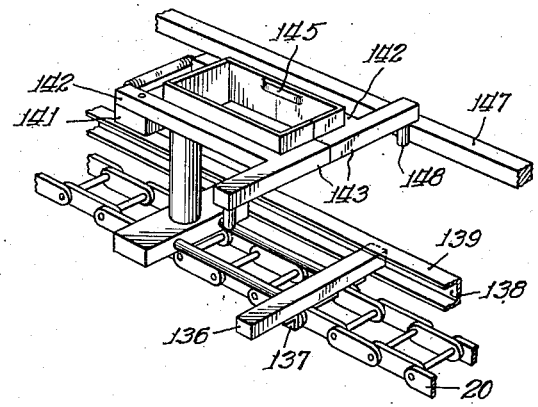
Fig. 8 shows the carton pocket of Fig. 7 in closed position.

Referring now to Figs. 7 and 8, each of the carton pockets 23 consists of a base bar 134 extending across chain 20 and rigidly secured to one of the links thereof, as by welding, a pair of rigid rods 135 extending forwardly therefrom terminating in a cross bar 136 and the upright post 114 mounted on bar 134 carrying the mechanism for receiving and gripping a carton near its upper edge. Rods 135 and cross bar 136 constitute the structure upon which the carton rests and bar 136 has a pair of lugs 137 on its lower surface spaced apart so as to receive a portion of chain 20 between them. While lugs 137 are not secured to chain 20 they serve the purpose of preventing lateral movement of the forward portion of carton pocket 23 when chain 20 is traveling in a straight line and thus enhancing the stability of carton pocket 23 when folding operations are performed on the carton therein. Bar 136 is substantially longer than bar 134 so that it may enter the grooves 138 in guides 139 as shown in Figs. 3, 5, and 8. From Figs. 1 and 1—A, it will be observed that guides 139 extend adjacent chain 20 throughout the entire upper reach of chain 20 between sprockets 21 and 22, and there is a similar pair of guides 140 extending along the lower reach of chain 20 thereby preventing any sagging of the latter and keeping the carton pockets 23 moving always in a straight line.

Referring again to Figs. 7 and 8, the carton-gripping mechanism comprises a cross bar 141 upon which are swingably mounted a pair of arms 142 having inwardly extending portions 143 at their ends. Arms 142 together constitute a pair of jaws of such dimensions as to enclose the particular carton to be handled, and they, as well as bar 141, have secured to their inner surfaces a number of small plates 144 extending above the upper surface of arms 142 to a point just below the top edges of the cartons to be enclosed thereby. Furthermore, these plates are of such thickness that when the jaws are closed as shown in Fig. 8, they will form a continuous collar which grips the carton firmly on all sides and holds it square. Furthermore, those plates 144 coming in contact with the carton side walls are provided with portions 145 in their upper central section which project slightly inwardly to cause a slight inward bending of the carton walls sufficient to prevent the flaps on the carton end walls from passing below the horizontal plane when they are folded. Also, it will be noted that members 141, 142 and 143 constitute a shelf which is capable of receiving such small amounts of excess thermoplastic material as may be forced from the flap surfaces during the sealing operation to be described, so that this excess material does not remain on the cartons and render them unsightly, nor does it drip on the various parts of the machine indiscriminately. Arms 142 are normally urged in the open position shown in Fig. 7 by means of coil spring 146, but as soon as the pocket 23 has traveled past the carton entrance point, the arms are moved to closed position by the action of cams 147 acting on rollers 148 mounted on the lower outer end of arms 142. This is best illustrated in Figs. 3, 4 and 8. As shown in Figs. 1 and 1—A, cam elements 147 extend along the machine substantially parallel to the path of chain 20 as the latter passes around sprocket 22 and as it returns toward sprocket 21 up to a point near the latter. Consequently, each carton is firmly held in the carton pocket while the flap-folding, heating and cooling operations are being performed and then returns toward the entrance end of the machine in upside-down position. Just before each pocket passes upwardly around sprocket 21, the cams 147 flare outwardly, thus causing arms 142 to assume an open position so that the carton contained therein slides downwardly and rests upside down upon belt 36 for removal from the machine.

In order that the various features of the invention may be completely understood, the operation of the embodiment thereof shown in the drawings will be described with respect to a typical carton passing through it, and the details of such of these features as have not already been mentioned will be given in connection with this description. In this example, the cartons are conventional tubular cartons of rectangular cross-section, which have been bottom-sealed and filled with the desired product, and which have a top flap on each of the side walls coated with a thermoplastic composition, these flaps being adapted to be overlapped to form a top closure.

In starting up the machine at least one and preferably several cartons are placed on belt 81 against rod 106 so as to assure the presence of a carton in the proper position to be transferred to an approaching carton pocket whenever the trip mechanisms are displaced so as to release trip arm 100 as shown in Fig. 3. Chain 20 and consequently belt 81 are then started and a succession of such cartons are made to approach the entrance mechanism on belt 81 between guides 105. Normally at least five cartons will be present or will accumulate on belt 81 so that roller 107 and lever 108 will be displaced in a clock-wise direction, and lever 111 will be held away from trip arm 100. As one of the carton pockets 23 approaches the entrance station, its upright column 114 will come in contact with roller 112 and lever 113 will be displaced in a counter-clockwise direction, thus causing lever 116 to release trip arm 100. As previously described, this actuates carton-pushing member 126 and the carton in contact with it is rapidly slid across plate 31 until it lies directly in the path of the approaching carton pocket. Pushing member 126 then returns to its original position and the next carton on belt 81 which has been held back by the off-set portion 127 moves forward sufficiently to come in contact with rod 106. In the meantime, carton pocket 23 continues its motion and the carton in its path is picked up by it. Almost immediately rollers 148 come in contact with cams 147 so that the arms 142 are swung to closed position and the carton is closely held in upright position by the plates 144.

The carton thus held continues its travel until the side wall flaps, that is, those which lie parallel to the direction of motion come in contact with the guide rods 149. These rods are best shown in Fig. 5 and serve merely to displace the side wall flaps slightly outwardly for a short time so that the other pair of flaps, herein called end wall flaps, may be folded without possible interference from the side wall flaps. The end wall flap-folding mechanism is very simple and consists merely in a pair of discs 25 which are mounted on shaft 150 and rotated by means of sprocket 72 as previously described. Discs 25 are arranged so that at their lowest point their peripheries are substantially in the same plane as the top edges of the approaching carton and they are spaced apart a distance such that they come in contact with the approaching end wall flaps near their side edges. Each of the discs 25 is provided with a cut-away portion or notch 151 in register with each other and the motion of discs 25 and chain 20 are so synchronized that the notches 151 face upwardly when discs 25 first come in contact with the leading end wall flap 152. Fig. 11 shows diagrammatically the relative positions of the carton and discs 25 shortly after the folding of flap 152 has begun, and it will be noted that this flap is smoothly and easily folded by progressive beneath discs 25. As the movement of chain 20 and discs 25 continues, notch 151 moves around and contacts the upper and outer edge of the trailing end wall flap 153, somewhat as shown in Fig. 12, so that finally flap 153 is folded into the same plane as flap 152, as illustrated in Fig. 13. It is necessary, in order to achieve the result just described, that the circumferential speed of discs 25 be greater than the linear velocity of the carton and in this case the parts are so synchronized that discs 25 make two revolutions while chain 20 is moving a distance equal to that between the corresponding parts of adjacent carton pockets. In other words, notches 151 operate on a trailing carton flap during every other revolution of discs 25. The advantages of this form of folding device are obvious since it is simple and smooth in operation and involves no reciprocating parts whatever.

Returning again to Fig. 5, a hold-down bar 154 is provided which retains flaps 152 and 153 in their folded condition until the side wall flaps can be folded over upon them and this hold-down bar 154 is heated by means of an electrical heating unit 155 for the purpose of pre-heating the folded flaps and softening the thermoplastic material thereon, which removes any beads or other irregularities in the material and materially aids the final heat-sealing operation. This pre-heating step is especially effective because of the fact that flaps 152 and 153 are prevented from entering the carton itself by the slight depression of the carton walls previously described so that they are necessarily held in good contact with the heated hold-down bar 154.

The carton in the advancing carton pocket is then acted upon by the side wall flap-folding devices 26 and 27 which act successively to fold the side wall flaps designated 158 and 159 in that order. As shown in Fig. 6 flap folder 26 includes a member 156 which is arranged to present a straight edge 160 to flap 158 along a line just above the top score line of its associated side wall and so to fold flap 158 into contact with flaps 152 and 153, as illustrated diagrammatically in Figs. 14, 15 and 16. This folding, however, is not done by moving the folding member 156 in a direction perpendicular to edge 160, but by causing it to follow a circular path such that edge 160 travels with, as well as toward and away from, the carton. This rotary motion is achieved by mounting the folding member 156 upon a pair of rods 161, which in turn are supported at one end by a block 162 mounted on an eccentric pivot on the upper surface of horizontal disc 163. Disc 163 is arranged to rotate about vertical shaft 164 and the other ends of rods 161 are similarly mounted on a similar disc not shown, adapted to rotate upon shafts 75 (Fig. 2). Since shaft 75, as has already been shown, rotates in a counterclockwise direction, shaft 164 will do likewise and the folding member 156 will travel in a circular translational manner. Also, this motion is synchronized with the motion of chain 20 so that edge 160 is caused to approach and to move with the carton just as the carton pocket is in the proper position with respect to it.

Folding device 27 similarly includes a member 157 mounted on rods 165 which in turn are supported by block 166 on disc 167, and the latter rotates with shaft 168. Shafts 164 and 168 rotate at the same rate and in opposite directions because of the intermeshing gears 169 and 170, and also because rods 165 are similarly supported at their other ends upon a corresponding disc mounted on shaft 76. In this case, of course, folding member 157 approaches the carton from the other side, but it acts in the same manner as shown in Figs. 17, 18 and 19. In the position of the parts shown in Fig. 6, folding device 26 is about to commence the folding of flap 158. These devices give efficient and positive folding action, due to the straight line action of the folding edges and they are also exceptionally smooth in operation because of the circular motion used. The folding members 156 and 157 are also provided with electrical heating units 171 and 172, which serve to prevent the accumulation of thermoplastic material upon them and also to preheat flaps 158 and 159 so as to prevent cooling of the thermoplastic materials on flaps 152 and 153 which have already been softened as described.

The carton in the advancing carton pocket is then ready for the heat-sealing operation, and so passes under the lower reach of belt 28, which holds the top flaps in their closed position. During the transition period these top flaps are kept closed by means of a series of rollers 173 which bear upon the uppermost of them. In the particular application of the invention being described, the top flaps are coated with a thermoplastic material and in order to heat-seal them, it is necessary to apply heat and pressure in a downward direction upon substantially the entire carton top so that this material may soften and flow so as to seal all of the cracks and crevices between and adjacent the flaps. It is, therefore, necessary that belt 28 should be heated in some way and in the present instance, belt 28 is of a material having a high heat conductivity through which heat passes from the electrical heating unit 31 to the top surface of the carton, and the distance between pulleys 29 and 30 and the length of heating unit 31 is such that the desired amount of heat is transmitted to the carton tops. In the presently preferred form of the invention, belt 28 is an endless steel belt and it is slightly wider than the cartons being sealed so that the heat is transmitted as evenly as possible to the carton. Heating unit 31 is also slightly wider than the carton and it has a smooth lower surface upon which belt 28 slides easily and with little friction, even though that surface is adjusted vertically so that it exerts a definite and substantial pressure upon the cartons traveling thereunder.

Upon passing under pulley 30 and leaving belt 28, the carton moves forward until the top surface thereof comes in contact with belt 32; the top flaps in the meantime being held in closed position by means of roller 174. While it would be possible to allow the cartons to cool while holding the top flaps closed by any suitable arrangement, this would result in an exceptionally and undesirably long top-sealing line, so that it is much preferred to cool the thermoplastic material at the top of the carton more quickly. In this instance, therefore, belt 32 is a steel belt similar to belt 28 and a cooling unit 35 is provided which has a smooth lower surface upon which belt 32 slides easily. Obviously the distance between pulleys 33 and 34 depends to a great extent upon the nature of the cooling medium used and if a refrigerant is circulated directly within unit 35, this distance can be quite short. Another factor which must always be taken into account is, of course, the rate of travel of chain 20, since this would determine the time that each carton is being heated through belt 28 and cooled through belt 32. When the carton has passed pulley 34, it is completely cooled and the top closure is effectively sealed.

Since cam tracks 147 extend around sprockets 22, the cartons remain in their carton pockets 23 and return substantially the entire length of the machine toward the entrance end but they are, of course, in upside down position. At a point just short of sprocket 21, cam tracks 147 flare outwardly so that arms 142 swing outwardly under the influence of spring 146 and the completely sealed carton is released therefrom. Belt 36 is arranged to travel somewhat below the cartons as they are released and slide downwardly from the various carton pockets in succession and serves to carry them in the same direction from the machine. Belt 36 and pulley 37 over which it travels, are not necessarily synchronized with chain 20, although they may be, but in this instance they are separately driven at a somewhat higher linear velocity so that the released cartons will be sure to clear pockets 23 before the latter start their upward travel around sprocket 21. One of the great advantages of this carton outlet arrangement is its simplicity, but another is the complete absence of reciprocating or timed motions which may get out of order.

It will be seen from the above that a carton sealing machine, in accordance with the invention, has been described which has many novel features and which is more advantageous than the devices of the prior art for many purposes and especially for heat-sealing cartons whose closure flaps have been coated with a thermoplastic material. Obviously many modifications may be made by those skilled in the art in the light of the above disclosure, but such modifications are intended to be within the scope of the present invention.

While the invention has been described in connection with a specific embodiment thereof, it is not desired to be limited thereto, but only by the scope of the following claims.

We claim:

1. A carton sealing machine especially adapted for closing and top sealing a series of filled cartons having integral top flaps coated with a thermoplastic composition and adapted to be overlapped to form top closures therefor, comprising an endless chain conveyor, means for driving said conveyor continuously in a predetermined direction, a plurality of carton pocket means mounted on said conveyor at evenly spaced intervals, each of said pocket means being adapted to receive a carton in upright position and to grip the same just below its top edges, means for inserting cartons into said pocket means as the latter pass a carton supply position, means for folding said top flaps to form carton closures as said cartons travel in said pocket means, an endless metal belt mounted to travel with its lower reach in contact with the uppermost of said folded top flaps, means for driving said belt at approximately the same speed as said chain conveyor, means for heating the lower reach of said belt and exerting downward pressure thereon sufficiently to cause said thermoplastic composition to flow into the cracks and crevices between and adjacent said flaps, a second endless metal belt mounted to travel with its lower reach in contact with the tops of the cartons emerging from contact with said first-mentioned belt, means for driving said second belt at approximately the same speed as said chain conveyor, means for cooling the lower reach of said second belt and exerting downward pressure thereon, and means for removing sealed cartons from said pocket means.

2. A carton sealing machine according to claim 1 wherein said heating means has a smooth metallic lower surface in direct contact with the upper surface of the lower reach of said first-mentioned belt throughout a substantial portion of the length thereof.

3. A carton sealing machine according to claim 1 wherein said heating and cooling means have smooth metallic lower surfaces in direct contact with the upper surfaces of the lower reach of said belt throughout a substantial portion of their lengths.

4. In a carton sealing machine for closing a series of cartons having their closure flaps at at least one end thereof coated with a thermoplastic composition, the combination comprising a conveyor adapted to move continuously in a straight line, means mounted at spaced intervals on said conveyor adapted to receive and retain a plurality of said cartons, means for folding one pair of end flaps on opposite side walls of each of said cartons successively to closed position while they are moving on said conveyor, separate means movable over said cartons for folding the other pair of end flaps on each of said cartons successively to closed position overlying said first-mentioned pair of flaps and overlapping each other while said cartons are moving on said conveyor, means for heating said separate folding means to soften said thermoplastic composition and means for exerting pressure upon said folded flaps.

5. The combination of claim 4 wherein said separate folding means includes a pair of folding members having smooth lower surfaces adapted to come into contact successively with substantial areas of the upper surfaces of said upper pair of flaps.

6. In a carton sealing machine for closing a series of cartons having closure flaps at least at one end thereof adapted to be overlapped to form a closure lying substantially in a single plane and having a thermoplastic composition distributed between at least certain of said flaps, said machine including a conveyor, pocket means on said conveyor for receiving said cartons, means for gripping said cartons adjacent their respective closures and means for folding said flaps to form said closure, the improvement which comprises belt means formed of a heat-conducting material, means for causing a reach of said belt means to move substantially in synchronism with said conveyor and in contact with substantially the entire outer surfaces of those of said flaps forming said closures, and means also in contact with said reach of said belt means for supplying sufficient heat and pressure thereto to cause said thermoplastic material to flow into the cracks and crevices between and adjacent said flaps.

7. A carton sealing machine especially adapted for closing and top sealing a series of filled cartons having integral top flaps coated with a thermoplastic composition and adapted to be overlapped to form top closures therefor, comprising an endless conveyor, means for driving said conveyor continuously in a predetermined direction, a plurality of carton pocket means mounted on said conveyor at evenly spaced intervals each adapted to receive a carton in upright position and to grip the same just below its top edges, means for inserting cartons into said pocket means as the latter pass a carton supply position, means for folding said top flaps to form carton closures as said cartons travel on said conveyor, means for causing flow of said composition into spaces between and adjacent said flaps comprising a first endless belt mounted to travel with its lower reach in contact with the uppermost of said folded top flaps and heating means for said lower reach exerting downward pressure thereon, means for causing sealing solidification of said composition comprising a second endless belt mounted to travel with its lower reach in contact with the tops of the cartons emerging from contact with said first belt and cooling means for the lower reach of said second belt, means for driving said belts at approximately the same speed as said conveyor, and means for removing sealed cartons from said pocket means.

THOMAS F. CASS, Jr.
DOUGLAS KIRK.
FRANCIS W. LANIGAN.

REFERENCES CITED

The following references are of record in the file of this patent:

UNITED STATES PATENTS

| Number | Name | Date |
|---|---|---|
| 733,460 | Cormack | July 14, 1903 |
| 1,066,193 | Ferguson | July 1, 1913 |
| 1,101,651 | Martin | June 30, 1914 |
| 1,140,574 | Chapman | May 25, 1915 |
| 1,290,888 | Bracy | Jan. 14, 1919 |
| 1,471,487 | Johnson | Oct. 23, 1923 |
| 1,646,496 | Sandberg | Oct. 25, 1927 |
| 1,660,185 | Bergstein | Feb. 21, 1928 |
| 2,007,439 | Barritt | July 9, 1935 |
| 2,014,555 | Chekian | Sept. 17, 1935 |
| 2,049,876 | Sticelber | Aug. 4, 1936 |
| 2,105,159 | Petskeyes | Jan. 11, 1938 |
| 2,114,833 | Fincke | Apr. 19, 1938 |
| 2,151,653 | Fincke | Nov. 21, 1939 |
| 2,206,203 | Richard | July 2, 1940 |
| 2,266,054 | Lowey et al. | Dec. 16, 1941 |